United States Patent
Van De Woestyne et al.

(10) Patent No.: US 11,798,054 B2
(45) Date of Patent: Oct. 24, 2023

(54) OPTIMIZED PRODUCT DETERMINATION SYSTEM

(71) Applicant: AMADEUS S.A.S., Biot (FR)

(72) Inventors: Li Van De Woestyne, Valbonne (FR); Jeremy Van De Woestyne, Valbonne (FR); Jerome Bauchot, Nice (FR); Jean-Chafic Hays, Valbonne (FR); Aurelie Camberbec, Antibes (FR)

(73) Assignee: Amadeus S.A.S., Biot (FR)

( * ) Notice: Subject to any disclaimer, the term of this patent is extended or adjusted under 35 U.S.C. 154(b) by 334 days.

(21) Appl. No.: 17/101,273

(22) Filed: Nov. 23, 2020

(65) Prior Publication Data
US 2021/0174419 A1    Jun. 10, 2021

(30) Foreign Application Priority Data

Dec. 6, 2019 (FR) ...................................... 1913844

(51) Int. Cl.
*G06Q 30/06*      (2023.01)
*G06Q 30/0601*    (2023.01)
*G06F 16/2455*    (2019.01)
*G06Q 10/087*     (2023.01)
*G06Q 30/0201*    (2023.01)
*G06Q 30/0283*    (2023.01)
*G06Q 50/14*      (2012.01)

(52) U.S. Cl.
CPC ..... *G06Q 30/0627* (2013.01); *G06F 16/2455* (2019.01); *G06Q 10/087* (2013.01); *G06Q 30/0206* (2013.01); *G06Q 30/0284* (2013.01); *G06Q 50/14* (2013.01)

(58) Field of Classification Search
CPC ............ G06Q 30/0627; G06Q 10/087; G06Q 30/0206; G06Q 30/0284; G06Q 50/14; G06F 16/2455
See application file for complete search history.

(56) References Cited

U.S. PATENT DOCUMENTS

| | | | |
|---|---|---|---|
| 7,043,094 B2 * | 5/2006 | Thomas | G06F 16/58 382/164 |
| 9,626,334 B2 * | 4/2017 | Kaul | G06F 16/2255 |
| 9,934,526 B1 * | 4/2018 | Dhua | G06Q 30/0623 |

(Continued)

OTHER PUBLICATIONS

Hobica, George, "More for Your Money; Before you settle for that spot . . . ; If you search carefully, you can find a good airline seat and cheap upgrades to business or first class." Los Angeles Times, Los Angeles, California, Feb. 16, 2014, L.7.*

(Continued)

*Primary Examiner* — Nathan Erb
(74) *Attorney, Agent, or Firm* — Thompson Hine LLP

(57) ABSTRACT

A search engine is configured to determine a set of main products that match search criteria of a search request. A search binary mask is generated based on the search criteria indicated in the search request which identify one or more ancillary products. If the search binary mask matches a reference binary mask representing the requested ancillary products, the main products are selected for the response to the search request. The search engine also verifies a current availability of the ancillary products associated with the selected main products and returns at least one of the main products for which the current availability has been determined.

20 Claims, 10 Drawing Sheets

(56) References Cited

U.S. PATENT DOCUMENTS

| | | | |
|---|---|---|---|
| 11,367,250 B2* | 6/2022 | Totty | G06T 19/006 |
| 11,423,636 B2* | 8/2022 | Najibikohnehshahri | G06K 9/6289 |
| 2012/0042291 A1* | 2/2012 | Granik | G03F 1/36 716/55 |
| 2016/0188533 A1* | 6/2016 | Kaul | G06F 7/00 712/2 |
| 2016/0225108 A1* | 8/2016 | Fishberg | G06Q 30/0283 |
| 2016/0307281 A1* | 10/2016 | Canis | G06Q 10/025 |
| 2017/0139948 A1* | 5/2017 | Kaul | G06V 10/955 |
| 2020/0394728 A1* | 12/2020 | Fishberg | G06Q 30/0627 |
| 2021/0027317 A1* | 1/2021 | Baghestani | G06Q 40/025 |
| 2021/0103969 A1* | 4/2021 | Sollami | G06K 9/6215 |
| 2022/0083959 A1* | 3/2022 | Skaff | G09F 3/0297 |
| 2022/0108264 A1* | 4/2022 | Skaff | G06V 20/52 |
| 2022/0138674 A1* | 5/2022 | Skaff | G06V 20/52 705/28 |
| 2022/0239829 A1* | 7/2022 | Piramuthu | G06Q 30/0643 |
| 2022/0375193 A1* | 11/2022 | Najibikohnehshahri | G06V 20/10 |

OTHER PUBLICATIONS

National Institute of Industrial Property, Preliminary Search Report issued in French Patent Application No. 1913844 dated Jun. 10, 2020.

European Patent Office, Extended European Search Report and Written Opinion issued in European patent application No. 20209700.2 dated Apr. 6, 2021, 7 pages.

* cited by examiner

OPTIMIZED PRODUCT DETERMINATION SYSTEM

TECHNICAL FIELD

The invention generally relates to client/server architectures and, in particular, to systems, methods, and computer systems for determining products stored in a database in response to a client request.

BACKGROUND

Over the past decades, the Internet has dramatically impacted the architecture of content provider systems which are based on client/server architectures. Modern content provider systems strive for integrating more and more dynamic and interactive features to improve user experience by limiting system latency and to optimize their computational resources.

Modern content provider systems use one or more servers which receive client requests from clients through a communication interface via a communication network. A user can submit a request (also referred to as a query) for content such as a product using a client device. The server can search for one or more candidate products that satisfy the user request, using a search engine implementing one or more searching processes, and return a response to the client through the communication interface. The response can comprise the list of candidate products computed by the search server and various information related to each candidate product. The user can then select one product among the candidate products to obtain more details on the product and possibly purchase the product through follow-up requests via the communication interface.

Some existing content provider systems can also provide ancillary products also called "complementary products", "auxiliary products", "services" or "ancillary services" for some candidate products. Accordingly, a user can access one or more ancillary products for each main product delivered by the content provider system.

For example, the content provider system may be a travel provider system which determines itinerary options in response to a user request for a travel, the user specifying on a user interface a set of parameter requests such as a date, a departure geographical location and an arrival geographical location, and possibly additional user preferences (e.g., fare type, connections, etc.). The user can thus access the dedicated user interface provided by the travel provider system and submit a travel request to obtain travel information and/or buy a travel product (travel booking) such as a flight product for a given itinerary at a given date. In some situations, the user may need additional services related to the travel product such as optional services related to the travel (e.g., meal service, seat related services, pet transport service, etc.).

The search engine of conventional content provider systems uses valuable computation resources to process each user request, such processing requiring a significant number of accesses to data stored in several databases or cache resources and to determine candidate products, thereby resulting in significant computational costs per user request. Further, each candidate product returned by the content provider system in response to the user request may be associated with a value (product price) which is computed using significant computation resources. Integrating the availability and value of a complementary product in the final price of a main product during the search process would increase the latency of the content provider system and negatively impact the user experience.

Improved systems and methods for providing main products in response to a user request are accordingly needed that integrate one or more ancillary products or services without impacting the latency and the computational resources of the system.

SUMMARY

According to a first aspect, a method for processing database search requests in a distributed computing environment comprising a search engine, a product cache database and an inventory database is provided. The product cache database is configured to store data records specifying main products retrieved from one or more provider databases, wherein each main product is associated with a reference binary mask representing in binary format a number of ancillary products associated with the corresponding main product, wherein the reference binary mask is generated based on data received from the provider databases and stored in the product cache database. The inventory database is configured to store availability data related to the main products and availability data related to the ancillary products associated with the main products. The method determines, at the search engine, in response to a search request from a client, a set of main products corresponding to search criteria indicated in the search request and generates a search binary mask based on the search criteria indicated in the search request which identify one or more ancillary products. The method determines a subset of the retrieved set of main products, the subset comprising the main products with associated ancillary products as identified in the search request, by retrieving from the product cache database the reference binary mask for each main product in the set and comparing the search binary mask with the reference binary mask for each main product in the set and selecting the main product for the subset if the search binary mask and the respective reference binary mask match. The method determines an availability for the ancillary products associated with each main product in the subset by retrieving the corresponding availability data from the inventory database. The method updates, for each main product in the subset, the reference binary mask in the product cache database if one or more of the ancillary products associated with the main product in the subset are determined as unavailable. The method returns at least one of the main products of the subset for which the availability of the associated ancillary products was determined to the client.

In some embodiments, the method determines by retrieving, in response to a search request from a client, from the product cache database, the set of main products corresponding to search criteria indicated in the search request and determines an availability for each main product in the subset by retrieving the corresponding availability data from the inventory database. For each main product in the subset, the method deletes the main product from the subset if the main product is determined as unavailable, thereby modifying the subset of main products.

In some embodiments the method determines by retrieving, in response to a search request from a client, from the one or more provider databases, the set of main products corresponding to search criteria indicated in the search request.

In some embodiments, the method computes one or more fares corresponding to the main products in the subset and/or the ancillary products associated with the main products in the subset and adds the computed fares to the subset and/or computes price solutions for the main products in the subset and/or the ancillary products associated with the main products in the subset and adds the computed price solutions to the subset.

In some embodiments, the reference binary mask and/or the search binary mask is a binary vector comprising a set of binary components, the binary components being generated by a predefined function.

According to some embodiments, the reference binary mask and the search binary mask is a Bloom filter.

According to some embodiments, the determination of an availability for each main product in the subset and/or the ancillary products associated with each main product in the subset comprises issuing an availability request to the inventory database and receiving a response to the availability request, identifying the main product and/or the ancillary product as available if the response to the availability request returns an indication that the main product and/or the ancillary product is available and identifying the main product and/or the ancillary product as unavailable if the response to the availability request returns an indication that the main product and/or the ancillary product is not available.

According to still another aspect, a search engine is provided for processing database search requests in a distributed computing environment comprising a product cache database and an inventory database. The product cache database is configured to store data records specifying main products retrieved from one or more provider databases, wherein each main product is associated with a reference binary mask representing in binary format a number of ancillary products associated with the corresponding main product, wherein the reference binary mask is generated based on data received from the one or more provider databases and stored in the product cache data-base. The inventory database is configured to store availability data related to the main products and real-time availability data related to the ancillary products associated with the main products. The search engine is configured to determine by retrieving, in response to a search request from a client, a set of main products corresponding to search criteria indicated in the search request and to generate a search binary mask based on the search criteria indicated in the search request which identify one or more ancillary products. The search engine is configured to determine a subset of the retrieved set of main products, the subset comprising the main products with associated ancillary products as identified in the search request, by retrieving from the product cache database the reference binary mask for each main product in the set and comparing the search binary mask with the reference binary mask for each main product in the set and selecting the main product for the sub-set if the search binary mask and the respective reference binary mask match. The search engine is configured to determine an availability for the ancillary products associated with each main product in the subset by retrieving the corresponding availability data from the inventory database and to update the reference binary mask in the product cache database if one or more of the ancillary products associated with the main product in the subset are determined as unavailable. The search engine is configured to return at least one of the main products of the subset for which the availability of the associated ancillary products was determined to the client.

In some embodiments, the search engine is further configured to determine by retrieving, in response to a search request from a client, from the product cache database, the set of main products corresponding to search criteria indicated in the search request and to determine an availability for each main product in the subset by retrieving the corresponding availability data from the inventory database and, for each main product in the subset, delete the main product from the subset if the main product is determined as unavailable, thereby modifying the subset of main products.

In some embodiments, the search engine is further configured to determine by retrieving, in response to a search request from a client, from the one or more provider databases, the set of main products corresponding to search criteria indicated in the search request.

In some embodiments, the search engine is further configured to compute one or more fares corresponding to the main products in the subset and/or the ancillary products associated with the main products in the subset and adding the computed fares to the subset and/or compute price solutions for the main products in the subset and/or the ancillary products associated with the main products in the subset and adding the computed price solutions to the subset.

In some embodiments, the search engine is configured to determine an availability for each main product in the subset and/or the ancillary products associated with each main product in the subset by issuing an availability request to the inventory database and receiving a response to the availability request, identifying the main product and/or the ancillary product as available if the response to the availability request returns an indication that the main product and/or the ancillary product is available and identifying the main product and/or the ancillary product as unavailable if the response to the availability request returns an indication that the main product and/or the ancillary product is not available.

In some embodiments, the reference binary mask and/or the search binary mask is a binary vector comprising a set of binary components, the binary components being generated by a predefined function.

In some embodiments, the reference binary mask or the search binary mask is a Bloom filter.

According to still another aspect, a distributed computing environment is provide comprising a product cache database, an inventory database and a search engine according to any one of the aforementioned aspects.

According to still another aspect, a computer program product is provided comprising program code instructions stored on a computer readable medium to execute the method steps according to any one of the aforementioned aspects when said program is executed on a computer.

BRIEF DESCRIPTION OF THE DRAWINGS

The present mechanisms will be described with reference to accompanying figures. Similar reference numbers generally indicate identical or functionally similar elements.

DETAILED DESCRIPTION

Figure 1:
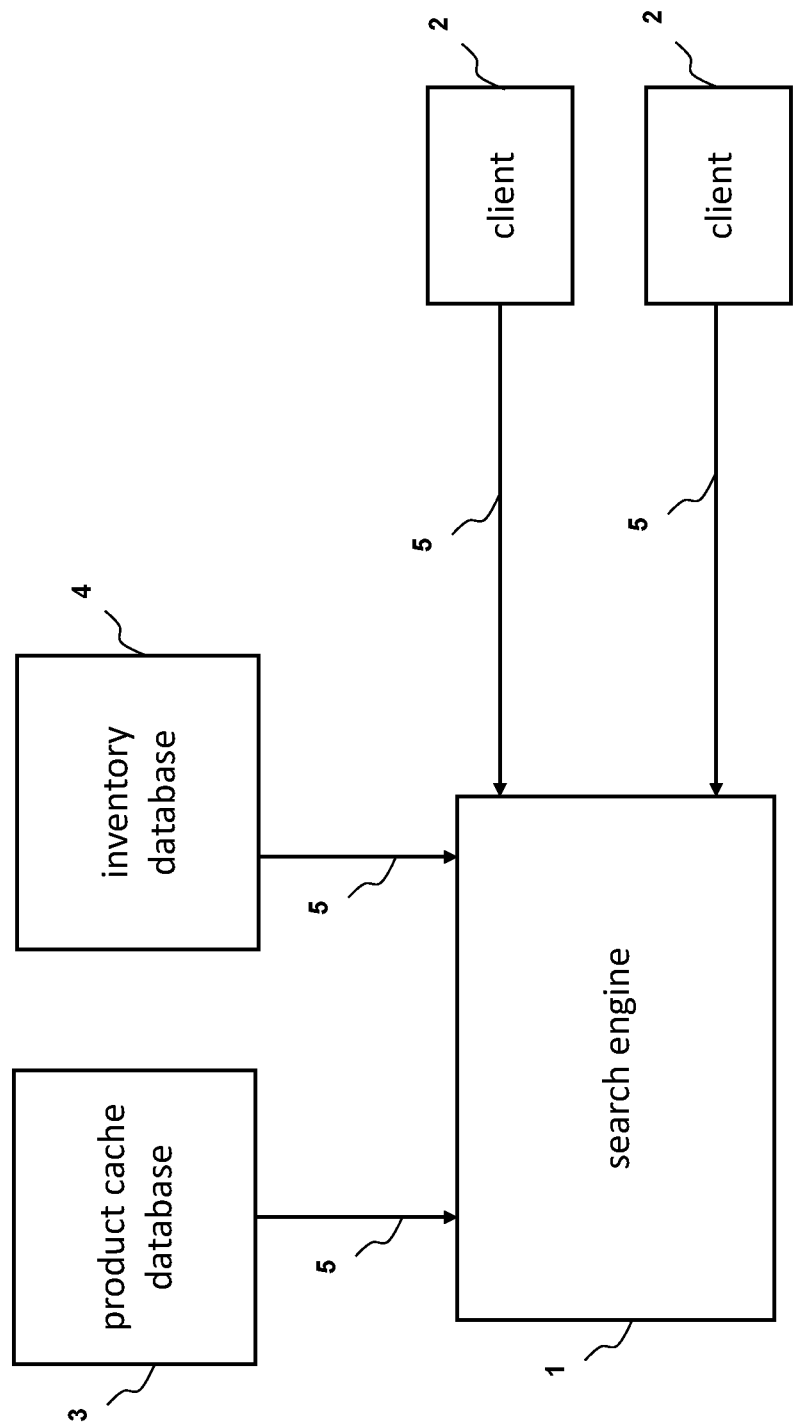
FIG. 1 is a diagrammatic view of a content provider system, according to some embodiments.

The subject disclosure generally pertains to processing database search requests in a distributed computing environment as shown in FIG. 1. The distributed computing environment comprises of a search engine 1, one or more clients 2, a product cache database 3, an inventory database 4. Clients 2, product cache database 3 and inventory database 4 are geographically located anywhere and are individual computing machines such as personal computers, mobile stations such as laptops or tablet computers, smartphones, and the like, as well, in some embodiments, more powerful machines such as database application servers, distributed database systems respectively comprising multiple interconnected machines, data centers, etc. In some embodiments, the product cache database 3 and/or the inventory database 4 might be similar machines as the clients 2, while, in other embodiments, the product cache database 3 and/or the inventory database 4 are more powerful (in terms of computation resources) than the clients 2.

Figure 10:
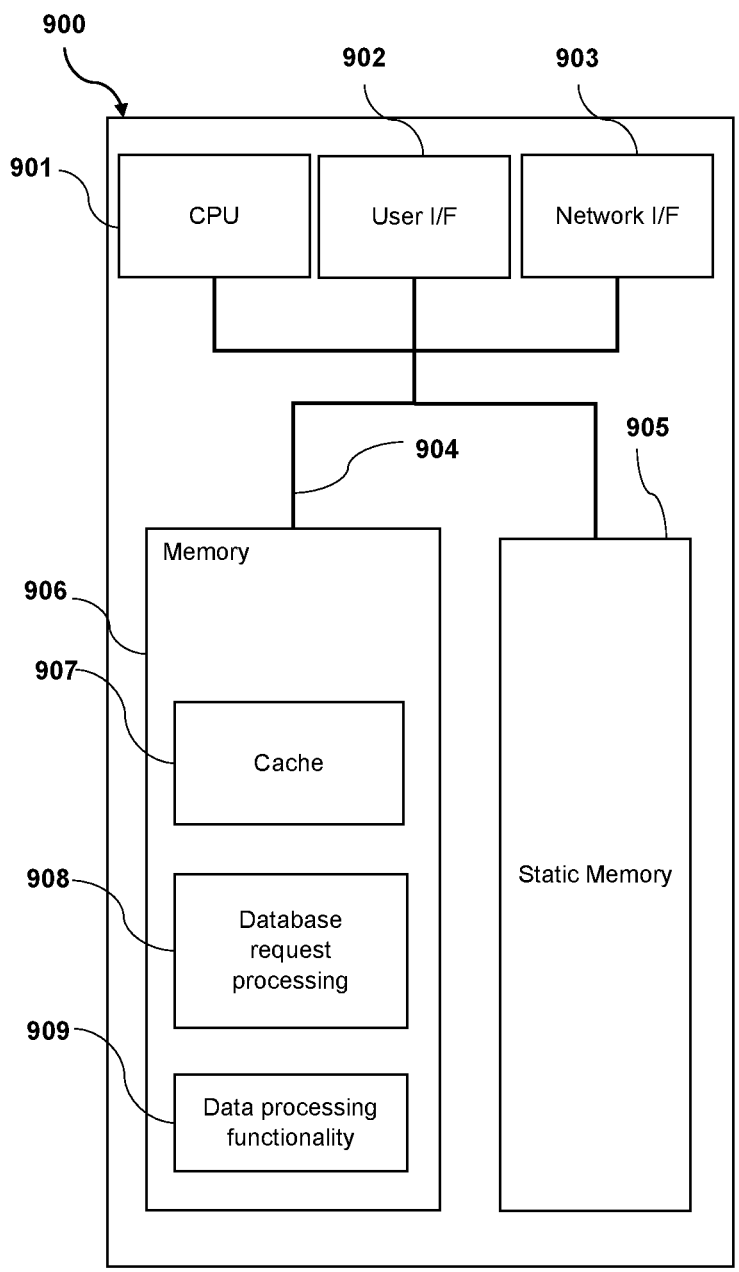
FIG. 10 is a diagrammatic representation of the internal components of a computing machine as described herein.

Product cache database 3, inventory database 4 and the clients 2 may be constituted of several hardware machines depending on performance requirements. Product cache database 3, inventory database 4 and clients 2, are embodied e.g., as stationary or mobile hardware machines comprising computing machines 100 as illustrated in FIG. 10 and/or as specialized systems such as embedded systems arranged for a particular technical purpose, and/or as software components running on a general or specialized computing hardware machine (such as a web server and web clients).

Product cache database 3, inventory database 4 and the clients 2 are interconnected by the communication interfaces 5. Each of the interfaces 6 utilizes a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols.

Search requests which are requested from clients 2 over the communication interfaces 5 are received at search engine 1. Search engine 1 may implement standardized communication protocols across the layers of the OSI reference model. Amongst others, the search engine 1 may employ initial processing mechanisms such as error recognitions and corrections, packet assembly, as well as determination whether a valid database query has been received. Invalid messages may be discarded already by the search engine 1 for reasons of security and performance.

Figure 4:
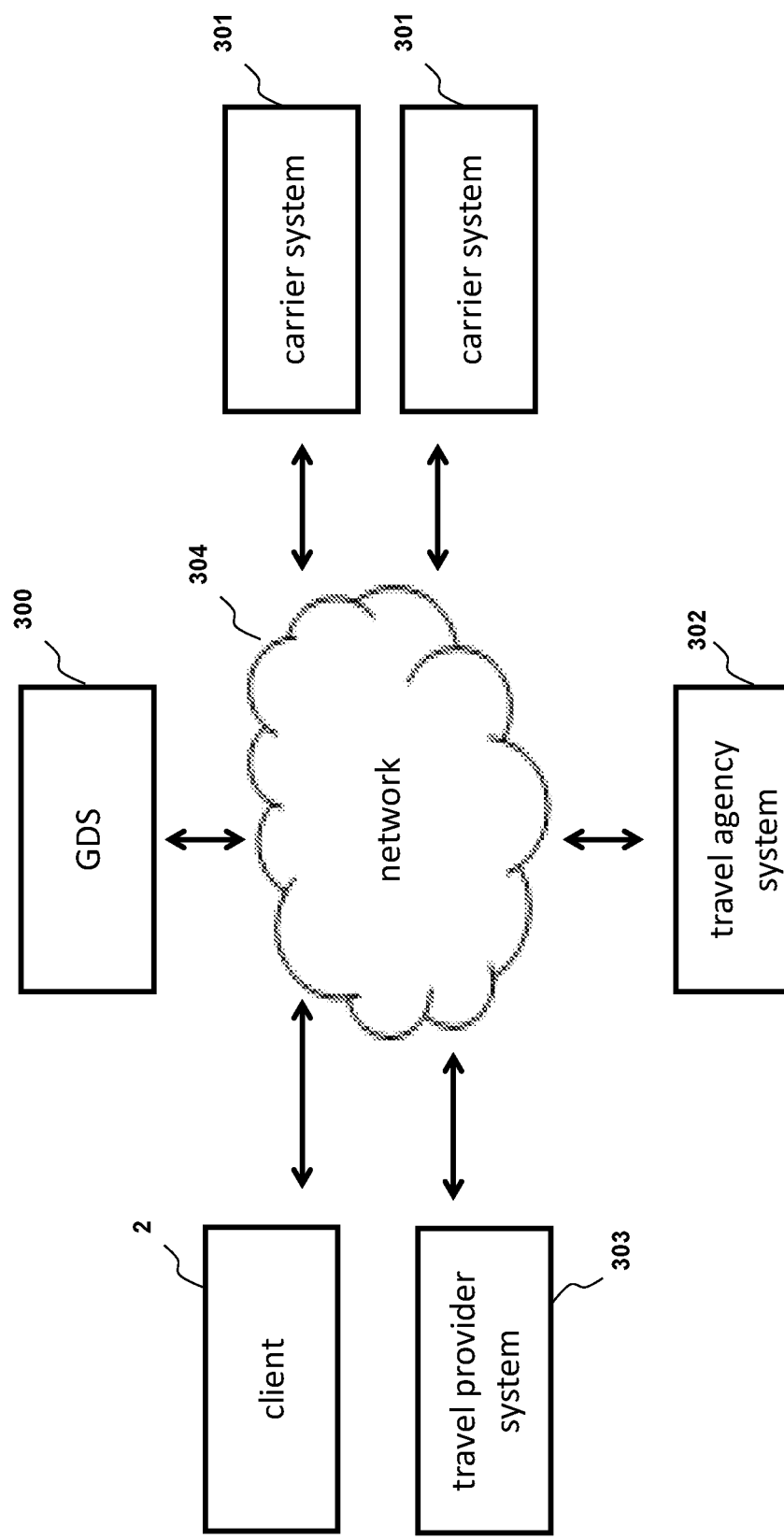
FIG. 4 shows an operating environment of a travel provider system according to one exemplary embodiment.

The product cache database 3 is configured to store data records specifying main products and associated ancillary products retrieved from one or more provider databases (such as travel provider system 303 of FIG. 4). The data records may specify pre-computed or cached ancillary products and, optionally, also pre-computed or cached main products. The main products are associated with a respective reference binary mask representing in binary format a number of ancillary products associated with the corresponding main product, wherein the reference binary mask is generated based on data received from the provider databases and stored in the product cache database. The reference binary masks facilitate efficient search and retrieval of ancillary products associated with a main product as explained in more detail below.

The product cache database 3 may be implemented as a further database in addition to the provider databases. In some embodiments, the product cache database 3 may also be a logical cache, i.e., the data of the product cache database 3 is held in respectively assigned areas of a memory of the hardware machine(s) which host(s) one or more provider databases and/or the search engine 1.

The inventory database 4 is configured to store availability data related to the main products and availability data related to the ancillary products associated with the main products. The inventory database 4, the one or more provider databases store data which is generally up-to-date and, thus, forms original or valid data. Furthermore, the product cache database 3 may also store up-to-date or real-time data records specifying the main products. The product cache database 3, inventory database 4, and the one or more provider databases may be equipped with an interface to update the data stored in the respective databases. This interface may be the same as the interface to receive and respond to search requests.

The data stored by the product cache database 3 may be kept updated, i.e., changes of the data are actually effected in the provider databases e.g., on an event-based or periodic basis. Hence, the product cache database 3 is either an original data source itself, such as a database maintaining any kind of original and generally valid results, or accesses one or more original data sources such as the provider databases in order to store original results in identical (mirror) or processed form. If the product cache database 3 generates/computes/collects the original results by accessing other/further original data sources in order to prepare original results at search time, the product cache database 3 provides results which generally accurately reflect the current content of the original response data.

The distributed computing system may be embodied as a content provider system that may be, for example, a transaction system implementing a processing flow starting from a search request received by the system for a product corresponding to at least some of the parameters of the request and terminated by a purchase operation of a product through the transaction system (a "transaction" may be for example a "purchase", a "shopping" or a "booking" operation). In a client/server architecture, a "transaction" thus corresponds to a request/response session initiated by a client request and terminated by the purchase of a product (selection of a main product by the user and validation of the selection by payment of the value (also referred to as "price") associated with the product). A product proposal determined and returned by the content provider system may comprise a main product and the ancillary product set (service set) comprising one or more ancillary products (services) related to the main product, the overall value (total price) of a transaction for a given product proposal comprising the value of the main product added to the value of the service set.

As used herein, the term "content" refers to any content that may be provided to a client 2 through a user interface in the form of products, each product being possibly associated with one or more services (ancillary product) related to the products. Each product may be defined by a set of parameters depending on the application field of the invention, and a value (or price). Each product can be subdivided into elementary parts (also called hereinafter "segment"). A segment of a product refers to the smallest portion of a product that can be delivered by the content provider system.

The content provider system may be adapted to perform transactions with the clients 2 (such as booking or purchasing of a main product including ancillary products (services) associated with the main product). A transaction for a product is completed when e.g. a user operating one of the clients 2 proceeds with the payment of the product (main product and required ancillary products associated with the main product). In some embodiments, the content provider system may be configured to process search requests which comprise at least a set of mandatory request parameters.

A user operating one of the clients 2 may directly interface with the content provider system using a dedicated user interface during a client/server session. In some embodiments, the content provider system may be configured to redirect client 2 to a dedicated interface of the content provider system, in response to a selection of a product by a user.

The content provider system may store user account information comprising information related to the user if the user is already registered to the content provider system. The content provider system may alternatively comprise no data related to the user if the user has not previously created a user account.

The content provider system may be dedicated to one or more application fields (for example, the travel or the transport field). In some embodiment, the content provider system may be configured to determine main products of a particular type (for example flights product in a travel application field).

In an exemplary application in the travel field, the content provider system may be a booking system configured to determine travel products (also called "travel proposals" or 'travel recommendations'), such as airline travel products, matching a travel request comprising a specified ancillary product (service) set. In this application, the search request 11 is a travel request.

The travel request may have a predefined format defining a set of request parameters including:
  departure location/date/time parameters;
  arrival location/date/time parameters;
  additional travel related parameters;
  a specified ancillary product (service) set.

Optional parameters of the search request 11 may include for example the user preferred language, or refining parameters (e.g., time of day, preferred company). A travel request parameter may have a typology (for example "departure location", "arrival location"), a data category (e.g., location, date), a data type (e.g., char) and/or a data format (defined for example by IATA standard, IATA standing for "International Air Transport Association").

The activities and functions presented in the subsequent embodiments are applicable for all database systems and computing systems with a hardware or functional architecture as shown in FIG. 1 or with a similar architecture.

Figure 2:
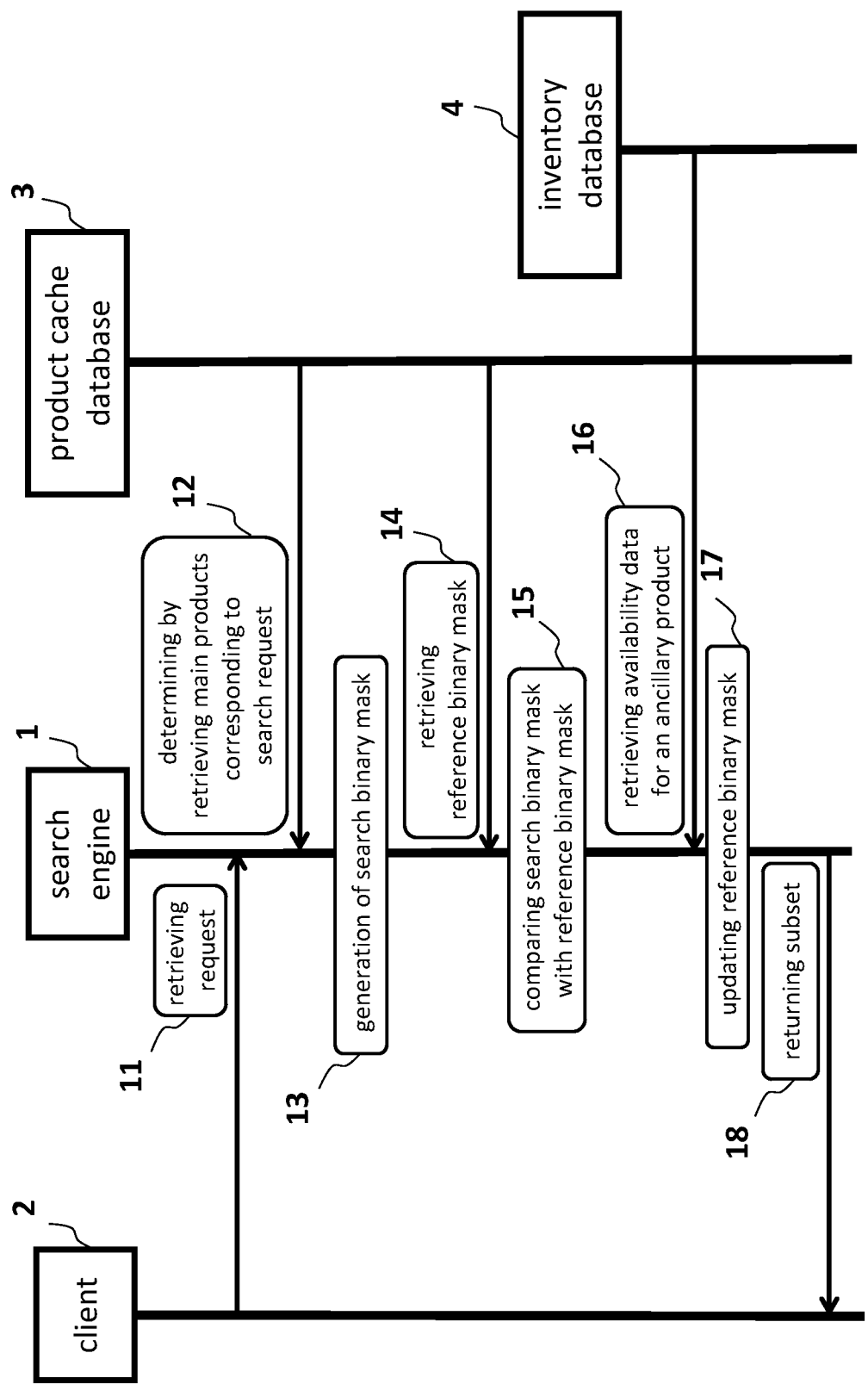
FIG. 2 is a sequence diagram for the processing of search requests at the search engine.

According to some embodiments and shown in FIG. 2, the search engine 1 determines, in an activity 12, in response to a search request 11 from a client 2 a set of main products corresponding to search criteria indicated in the search request 11. To cite an example, the search request 11 from a client 2 may comprise all flight connections from London (as departure location) to Paris (as arrival location) at 1 Dec. 2019. In response to the search request 11, search engine 1 retrieves all corresponding flight connections for that day, which are assumed for the sake of simplicity to be all provided by the carriers Air France and Lufthansa.

The retrieving by the search engine 11 may comprise a pre-filtering, which may be comprised in activity 12 and which may be applied when real-time computed main data are retrieved. The pre-filtering may include checking a config file that comprises information on routes and carriers. The config file may also comprise which ancillary services are supported. At this stage, main products that do not provide the requested ancillary products in general may be already sorted out from the outset. To further cite the aforementioned example, the pre-filtering may limit the main products only to those carriers, which provide flight connections from London (as departure location) to Paris (as arrival location) at 1 Dec. 2019, such as Air France and Lufthansa. In the case British Airways does not provide said flight connection, this carrier is left out by the pre-filtering.

According to the method shown in FIG. 2, search engine 1 generates in an activity 13 a search binary mask based on the search criteria indicated in the search request 11 which identify one or more ancillary products. The search binary mask represents the search criteria of the search request 11 which define the ancillary products sought by the user. With continued reference to the aforementioned example, the ancillary products (or services) may comprise a baby cot or the provisions for having a pet in a cabin. Search engine 1 then determines a subset of the retrieved set of main products, whereby the subset comprises the main products with currently available associated ancillary products as identified in the search request 11. To this end, at a first stage, main products are determined based on a binary mask comparison (as explained in detail below) which are generally associated with the requested ancillary products (also referred to as ancillary filter). At a second stage, a current availability of the ancillary products of these determined main products is verified with an availability source, the inventory database 4 (also referred to as availability filter). The remaining main products form the subset.

Citing again the aforementioned example, it is assumed that only the carrier Air France offers the ancillary products (services) of a baby cot or having a pet in the cabin on its flights from Paris to London whereas the carrier Lufthansa does not offer these ancillary products on its flights from Paris to London. The determined subset therefore excludes all flight connections from London to Paris offered by Lufthansa and includes the corresponding connections offered by Air France. The determination of the subset is performed by retrieving, in an activity 14, from the product cache database the reference binary mask for each main product in the set and comparing, in an activity 15, the search binary mask with the reference binary mask for each main product in the set and selecting the main product for the subset if the search binary mask and the respective reference binary mask match.

In an activity 16, search engine 1 determines an availability for the ancillary products associated with each main product in the subset by retrieving the corresponding availability data from the inventory database 4. Search engine 1 then updates, in an activity 17, for each main product in the subset, the reference binary mask in the product cache database if one or more of the ancillary products associated with the main product in the subset are determined as unavailable. In an activity 18, search engine 1 returns at least one of the main products of the subset for which the availability of the associated ancillary products was determined to the client 2. Remaining within the aforementioned example, if a particular Air France flight from Paris to London on 1 Dec. 2019, which may have a flight number of e.g. AF123, offers the service of a baby cot, this particular flight—AF123—may be included in the main products returned by search engine 1 in activity 18.

Further citing the aforementioned example, an unavailability of an ancillary product may occur when e.g. all baby cots on the Air France flights from London to Paris are already booked for the 1 Dec. 2019. In this case, the search has no results and the client 2 may be notified that there are no flights between the origin and destination on the requested dates that provide the requested ancillary service.

According to some embodiments, in response to a search request 11 from a client 2, a set of main products corresponding to search criteria indicated in the search request is determined by retrieving from the product cache database 3 and an availability for each main product in the subset is determined by retrieving the corresponding availability data from the inventory database 4. Remaining in the cited example, the method determines if a certain flight connection from London to Paris operated by the carrier Air France on the 1 Dec. 2019 is already fully booked and therefore unavailable. In some embodiments, for each main product in the subset, the main product is deleted from the subset if the main product is determined as unavailable, thereby modifying the subset of main products. An already fully booked flight connection would therefore be deleted from the subset.

In an embodiment, activity 12 may comprise determining by retrieving, in response to a search request 11 from a client 2, from the one or more provider databases, the set of main products corresponding to search criteria indicated in the search request 11 (pre-filtering as introduced above). The retrieved set of main products may be stored in the product cache database 3.

According to some embodiments, one or more fares corresponding to the main products in the subset, e.g., for the flight connections from London to Paris, and/or the ancillary products associated with the main products in the subset are computed and the computed fares and/or computing price solutions for the main products in the subset and/or the ancillary products associated with the main products in the subset and/or the computed price solutions are added to the subset. The computation of fares is described further below.

According to some embodiments, the reference binary mask and/or the search binary mask is a binary vector comprising a set of binary components, the binary components being generated by a predefined function. According to some embodiments, the reference binary mask and the search binary mask is a Bloom filter.

In general, a Bloom filter is a space-efficient probabilistic data structure used to test whether an element is a member of a set. False positive matches are possible, but false negatives are not. A query returns either "possibly in set" or "definitely not in set". Elements can be added to the set, but not removed, however, the more elements that are added to the set, the larger is the probability of false positives.

In an encoding phase, which may be implemented offline and/or when the product cache database 3 is updated (i.e., not at search query time), a reference binary mask represented by a binary vector (also called "encoding vector") is built for a given segment of a main product using the availability data of ancillary products stored in the inventory database 4. A decoding phase is implemented in the flow of executing a search request 11 received from a client 2. In the decoding phase, a search binary mask represented by a binary vector (also called "decoding vector") is built for each main product determined in response to the search request 11.

More specifically, in the encoding phase, N predicates may be formed, one or more predicates corresponding to the availability of one or more ancillary products (services) for a main product using data related to the product availability from the inventory database 4. For example, a predicate may be in the form of "service X is available for flight Y", in an application of the invention to the travel field. A predicate formed in this way is then passed through M transformation functions, each transformation function returning at least one bit position in the bit vector, such bit vector thus representing a Bloom filter for the considered predicate. This provides N bit vectors V (also called "binary masks" or "Bloom filters"), each binary vector generated for the considered main product being associated with at least one ancillary product and having an arbitrary length k. Each position of a binary vector Vis assigned a bit value representing a bit information which may have a first value (for example "1") or a second value (for example "0"). The bit vectors V thus generated may be stored in a database optimized for search. In some embodiments, the Bloom filter V computed for the ancillary product associated a given main product may be stored in a data structure such as the Bloom filter matrix or array of dimension Nx k. The binary masks V generated in the encoding phase are also referred to herein as "reference binary masks" (or "reference binary vectors" or "reference Bloom filters").

In the decoding phase, which is triggered during the product search process implemented in response to a search request 11 specifying request parameters including ancillary products, N predicates related to the ancillary products specified in the search request 11 may be determined for each main product found by the search engine 1, and passed through the M transformation functions (which are the same transformation functions as in the encoding phase). This provides a binary mask ("search binary mask") to be compared with the reference bit mask of each main product generated in the encoding step. More specifically, in some embodiments, the search binary mask is compared with the reference mask of a main product in a bit-wise manner. If a particular bit in the search binary mask matches the corresponding bit of the reference bit mask, this indicates that the main product is in fact associated with the corresponding ancillary product. In some embodiments, if at least one bit of the search binary mask occurs in the reference binary mask, the corresponding main product is included in the subset, as the at least one corresponding ancillary product exist for the main product. In other embodiments, a main product is included in the subset if the comparison of the search binary mask with the reference binary mask yields that all ancillary products prescribed by the search binary mask exist for the main product. If none of the bits of the search binary mask does not match the corresponding bit of the reference binary mask, the main product may be discarded and excluded from the subset.

The M transformation functions used in the encoding and decoding phase may be hashing functions or alternatively cryptographic functions. The following description of some embodiments will be made with reference to an embodiment in which the M transformation functions consist of M hashing functions for illustration purpose only. The hashing functions used to generate the Bloom filters may have a low collision rate. The number of hashing functions may depend on various parameters.

The use of a probabilistic data structure yields an efficient utilization of the storage resources of the content provider system formed by the distributed computing environment.

To update the Bloom filters, a re-computation phase may be implemented (for example offline or in a learning process after processing the search request 11 has concluded) by refreshing such availability information related to each ancillary product among the predefined list of ancillary products.

The Bloom filters may be used to generate binary patterns (corresponding to the binary vectors V) representing availability of each ancillary product for a given main product, thereby enabling compression of the information indicating the existence of ancillary products associated with the main product. A unique combination of all of the generated binary patterns may be selected and kept for each main product.

For example, the exemplary table shown below depicts the association obtained between a given itinerary segment AF123—a flight connection between London (LON) and Paris (PAR) at a given time on December 1—of the travel options computed by the search engine 1, one or more ancillary products (e.g., "Bassinet for baby" or "Pet in cabin" or {"Bassinet for baby" and "Pet in cabin"}) and a Bloom filter:

TABLE 1

| Journey Segment | Ancillary products | Bloom filter |
| --- | --- | --- |
| AF123 LON-PAR DEC01 | Bassinet for baby | 10000001 |
| AF123 LON-PAR DEC01 | Pet in cabin | +10000010 |
| AF123 LON-PAR DEC01 | — | =10000011 |

As shown in TABLE 1, the ancillary product "Bassinet for baby" is determined as available for the itinerary segment "AF123 LON-PAR DEC01" and is associated with a Bloom filter (forming a "binary mask") "10000001", the ancillary product "Pet in cabin" is determined also as available for the itinerary segment "AF123 LON-PAR DEC01" and is associated with a Bloom filter "10000010". The resulting Bloom filter 10000011 for the combination of ancillary products {"Bassinet for baby" and "Pet in cabin"}, for the considered segment "AF123 LON-PAR DEC01", is obtained by applying a logical OR to the elementary Bloom filter "10000001" and "10000010".

The encoding phase thus provides a Bloom filter for each ancillary product combination (service set) available for each segment of a main product.

Figure 3:
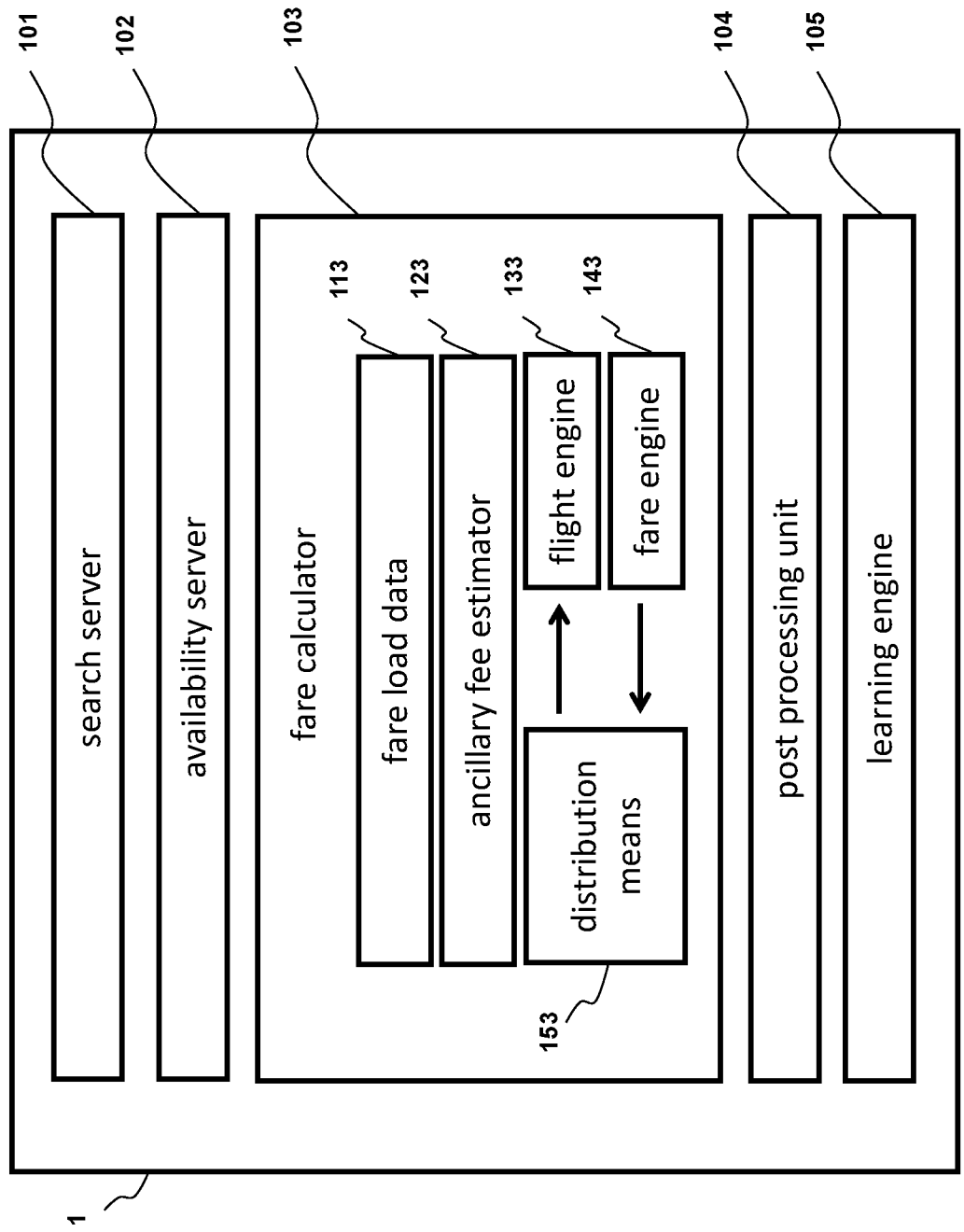
FIG. 3 shows a diagrammatic view of a search engine, according to an exemplary application of the invention to the travel field.

FIG. 3 depicts the search engine 1 according to some embodiments. The search engine 1 comprises a search server 101 (also called "itinerary planner") configured to search main products (flights) satisfying a search request 11, in response to the receipt of the search request 11 from a client 2 through one or more networks 5, the search request 11 identifying a desired main product.

The search engine may be embodied as a travel provider system that may be configured to provide travel content to the user including travel products or booking information. The travel provider system may comprise a dedicated user interface which can be used to exchange information with a client or user. In particular, users may submit via clients 2 a search request 11 (also referred to thereinafter as a "user request" or a "user query") through a user device or provide user inputs through the user interface. The travel provider system may in turn display the results obtained for a given search request 11. Such results may comprise a set of main travel products, each comprising travel information and auxiliary information such as the product value (also called "product price" or "travel price"). A rendering of the main travel product may be generated in the dedicated interface in the form of travel proposals (also referred to as "itinerary options" or "travel options"). The user may thus select through the user interface one the itinerary options corresponding to a main travel product to book. As used herein, a "travel proposal" corresponds to a main travel product representing a travel between an origin location and a destination location, and is associated with scheduling information comprising the scheduled departure date and time of the travel and the scheduled arrival date and time of the travel. A travel product corresponding to an itinerary may comprise a set of segments (elementary portions of the products) interconnected at connection point or connection hub, each segment being associated with schedule information.

The travel provider system may be hosted at a public website available to any user with an intuitive user interface to allow direct travel shopping by any user. Alternatively, the travel provider system may be a specialized system provided for travel operators or agents, available through a private website, as a webservice, or through a private application.

The search server 101 generates the itinerary options. The itinerary options may comprise itineraries, which are computed in real-time and received from one or more provider databases and pre-computed itineraries stored in the product cache database 3.

The travel provider system may use a pre-filter (or first filter) to perform pre-filtering of the itinerary options by ancillary products. The pre-filter may be configured to remove non-candidate flight products, thereby limiting the route construction to only the airlines systems that provide the required routes, e.g routes from Paris to London. The pre-filter may be part of the search server 101 or separated from each other.

The travel provider system may use an ancillary filter (or second filter) to further reduce the set of main products obtained by pre-filtering, namely by excluding such main products which are not associated with the ancillary products that are requested by the search request 11, thereby determining a subset of the set of main products obtained by pre-filtering. Ancillary filtering is performed by comparing the search binary mask with the reference binary mask for each main product in the set and selecting the main product for the subset if the search binary mask and the respective reference binary mask match, as described above.

The travel provider system may further use the availability server 102 to determine available products. The travel provider may compute fare combinations for the results (itinerary options) determined by the search server 101.

A fare calculator 130 may determine the flight fares for the itinerary options which are determined to meet the availability conditions. The fare calculator 103 may comprise a fare engine 143 configured to determine (or compute) the fare combinations and a flight engine 133 configured to determine available flights, both interacting with distribution means 153. The fare engine 143 may use fare load data 113 stored in storage means storing fare data related to the products delivered by the travel provider system.

An availability filter (or third filter) may be applied to the results (travel options) determined by the search server 101 to perform additional filtering of such results by ancillary availability criteria using one or more probabilistic data structures such as Bloom filters. The availability filter may be part of the availability server 102 or separate from each other. The availability filter may be configured to only limit the fare construction to segments of the itinerary options returned by the search server 101 having enough availability for the ancillary product.

The travel provider system may further comprise an ancillary fee estimator 123 configured to estimate ancillary fee based on fee estimation criteria. The ancillary fee estimator 123 may interact with one or more components of fare calculator 103. In some embodiments, as depicted in FIG. 3, the ancillary fee estimator 123 may be part of the fare calculator 103. The ancillary fee estimator 123 may be configured to perform flight fare construction and sort in order the estimated prices of the products selected by the availability server 102. To estimate the price of a selected product, the ancillary fee estimator 123 integrates the estimated price (estimated product value) of the requested ancillary product into the overall price of the travel product (price of the main product complemented by the price of the specified ancillary product). The post-processing unit 104 may compare at least a part of the selected products, which may have the lowest estimated prices, with real-time data from the inventory database 4 (which includes real-time availability and price data) according to the ordering of the products per estimated price performed by the ancillary fee estimator 123. In some embodiments, the part of the selected products which are compared with real-time data from the inventory database may comprise the P products having the higher estimated prices, P being determined based on a set of criteria (for example, P may be fixed or dynamically changed at each execution of the product determination method).

It should be noted that the product value (service price) associated with an ancillary product set related to a given product may be dependent on the product. Further, the price of an ancillary product related to a travel product may depend on various parameters such as for example, the type of the product to which the ancillary product is related (e.g., equipment, type of plane); location information related to the product (the location information related to a product may impact the price); the sale strategy implemented in a product provider system (promotion campaign for example); and/or the category of the product (a category may include for example long flight category, business class, economy class).

In some embodiments, when current product availability is independent from complex fare information, the availability estimation provided by the ancillary fee estimator 123 can be pushed from ancillary fee estimator 123 to the availability filter.

The travel provider system may also comprise a post-processing unit 104 (also referred to as an "ancillary service sweeper" or "ancillary sweeper") configured to perform post processing of the results returned by the availability server 102. The post-processing unit 104 may be configured to compare the availability and price estimated for the specified ancillary products for each itinerary option (main product) with real time availability data (actual availability) and real time value information (actual price) associated with ancillary products for previously computed flight products using real time data. The post-processing unit 104 may then post-filter the search results returned by the availability server 102 depending on such comparison. The post-processing unit 104 may be advantageously based on a non-cache structure to maintain guaranteed data.

In some embodiments, the content provider system may further comprise a learning engine 105, e.g. a machine learning system configured to collect data during a pre-defined learning period and store them into one or more learning data structures (e.g., matrix). The collected data may comprise data generated during search requests 11, which have been sent from clients 2 over a defined time period. The collected data may then serve as training data for the machine learning system. In such embodiments, the provider system can optimize the searches made in response to a search request 11, using said training data as stored in the learning data structure. Such learning engine 105, thus forming a lazy cache, enables a reduction of the work of the offline process.

FIG. 4. represents the operational environment of a travel provider system 303, which can be embodied by a content provider system, in an exemplary application of the invention to the travel field. The environment may include a global distribution system (GDS) 300, one or more indirect product provider systems such as carrier systems 301, one or more travel shopping or indirect seller systems (auxiliary content provider systems), such as a travel agency system 302, the travel provider system 303 and one or more clients 2. Each of the GDS 300, the carrier systems 301, the indirect seller system 302, the travel provider system 303, and the client 2 may communicate through the network 304. The carrier systems 301 may each include a computer reservation system (CRS) and/or billing system for the respective airline that enables the GDS 300 and/or indirect seller system 302 to reserve and pay for airline tickets. The carrier systems 301 may also interact with each other, either directly or through the GDS 300, to enable a validating carrier to sell tickets for seats provided by an operating carrier. The operating carrier may then bill the validating carrier for the products provided.

The GDS 300 may be configured to facilitate communication between the carrier systems 301 and indirect seller systems 302 by enabling travel agents, validating carriers, or other indirect sellers to search for available segments and book reservations on one or more carrier systems 301 via the GDS 300. The GDS 300 may maintain links to each of the carrier systems 301 via the network 6 to allow the GDS 300 to obtain scheduling and availability data for segments from the carrier systems 301. The carrier and travel agency systems 301, 302 may thereby book flights, trains, or other types of segments on multiple carriers via a single connection to the GDS 300. The GDS 300 may store and/or maintain a Passenger Name Record (PNR) that includes a complete set of data for an itinerary of a trip, including segments from multiple carriers and/or other travel products comprising the trip such as hotel and rental car reservations.

A travel agency system 302 may include a web server that provides a publicly accessible website. This website may be configured to provide access to travel planning features, such as the ability to search for travel products matching a travel request. To this end, the travel agency system 302 may provide the traveler with access to data from one or more databases hosted by the GDS 300, carrier systems 301, and the travel agency system 302. In an alternative embodiment of the invention, the travel agency system 302 may be a proprietary system that limits access to travel service providers or travel agents. In such case, access may be provided through a private website or other application.

The travel provider system 303 may be in communication with the travel agency system 302 via the network 304 or some other suitable connection. In alternative embodiments of the invention, all or a portion of the travel provider system 303 may be integrated into one or more of the other systems 300, 301, 302. Travelers or travel agents may use the travel agency system 302 to generate and/or search for travel proposals that satisfy a travel request received from the traveler using the travel provider system 303.

The GDS 300, carrier systems 301, the travel agency system 302, the travel provider system 303, and the clients 2 of the operating environment may be implemented on one or more computing devices or systems, referred to collectively as a computer, such as computer 900 of FIG. 10.

Turning back to FIG. 3 and FIG. 4, the search server 101 may receive a travel request from a client 2 comprising request parameters such as an origin location, and/or a destination location (for example in the form of city locations according to IATA format or specific points of access in a city such as airports or terminals for airline mode of transport, stations for rail mode of transport, or street addresses or specific city points of access). The origin location corresponds to the desired geographical location of the travel departure and the destination location corresponds to the desired geographical location of the travel arrival. In some embodiments of the invention, the search server 101 may convert the origin and/or destination locations specified in the request into geographic coordinates such as GPS coordinates to determine the closest corresponding points of access. In embodiments where the user is equipped with a user device of a mobile device type, the origin location of the user may be automatically detected by the search server 101 or by the travel provider system 303 based on the user positional data. The user can also enter through the user interface additional request parameters such as departure and arrival timetable information including desired date and/or time information associated with the departure (origin) and/or with the arrival (destination) of the requested travel. The user may also input user preferences through the dedicated user interface, which may comprise additional user criteria. Such user criteria may be used by the search server 101 as search criteria (such as cost, distance, or speed criteria to compute the products).

The search server 101 may then determine which existing routes per airline match the itinerary identified by the parameters of the search request 11 and schedule travels for a specific mode of transport (such as airline mode of transport), for a specific travel carrier (for example Air France), or for multiple modes of transport (for example both flight and rail modes of transport). For a multi-modal search server 101, the computed itinerary options may include segments related to the different modes of transport and the user may specify user preferences related to the preferred modes of transport.

The user may initially submit a search request 11 through client 2 which comprises specified ancillary products through a dedicated interface of the content provider system. The search server 101 may then perform a search using the pre-filter, as described above, to identify those main products which correspond to the main product search parameters of the search request, thereby establishing a set of main products. Subsequently, the search server 101 may perform an ancillary filtering by removing these main products from the set of main products that do not provide the specified ancillary products, using the data maintained in the one or more product cache databases 3. Search server 101 thereby established a subset of main products for which the requested associated ancillary products exist. The ancillary filter thus provides a reduced search space. When performing this activity, the ancillary filter may use an ancillary library, which may be part of the inventory database 4. The ancillary library may provide a list of supported ancillary products to reduce the search space using as input the specified ancillary products of search request 11 (in an implementation of the invention to the travel field, the ancillary library may for example provide a list of supported ancillary products per carrier). The ancillary filter thus filters the search space (comprising main products that generally fulfill the main product search criteria of the search request) by ancillary product type.

The search server 101 may then further process the main products that match the search request only in the reduced search space, which means that it computes the itinerary options that meets the remaining request parameters (other than the specified ancillary product parameter) among the travel products included in the reduced search space. The ancillary filter thus provides a filtered subset of main products which meet the specified ancillary product condition. The use of the ancillary filter before performing fare construction prevents from processing fares for an airline that does not support the specified ancillary product. If the specified ancillary products are submitted to quotas in association with the products (e.g., quota per flight, per class category, etc.), additional optimization processing may be implemented using the availability filter 400.

Figure 5:
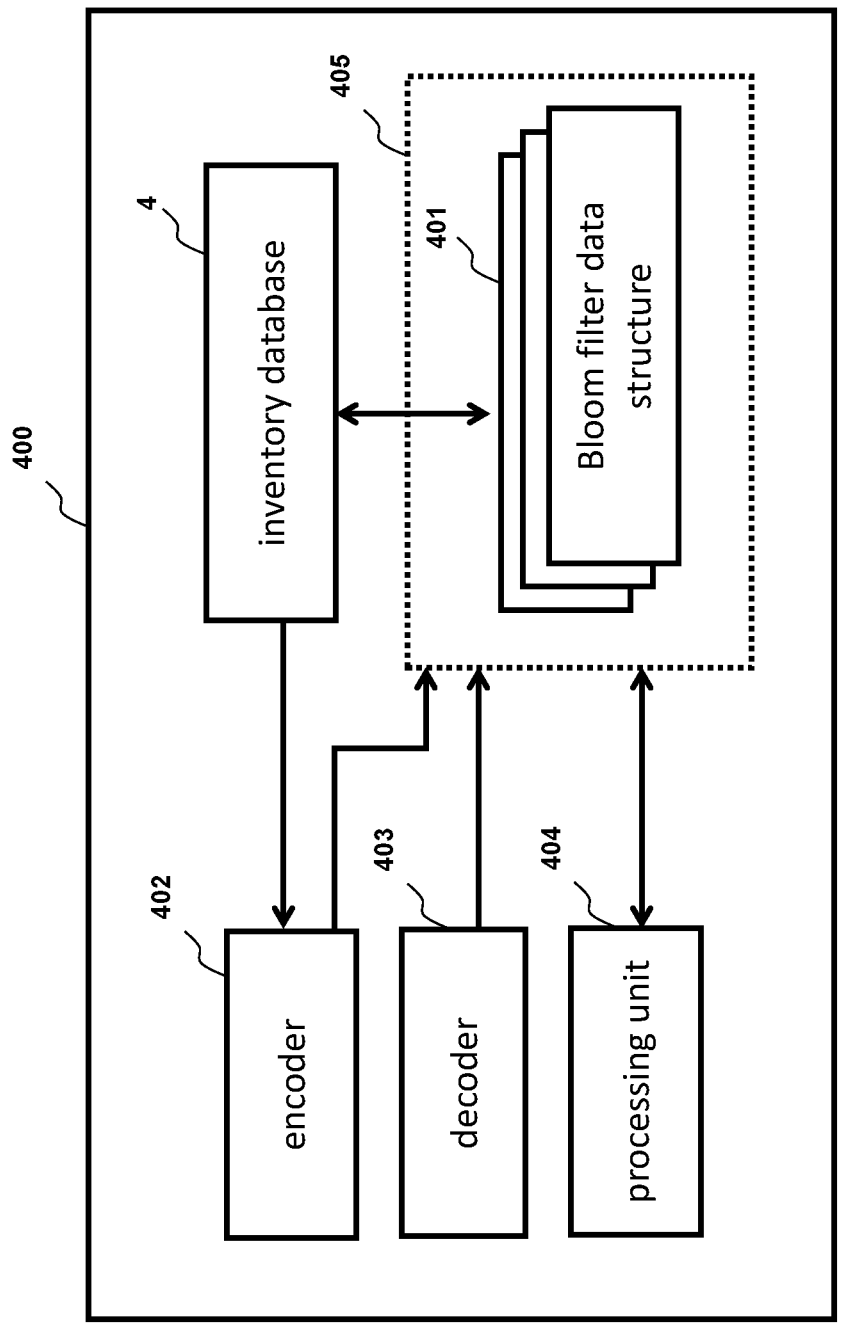
FIG. 5 is a block diagram of a filter, according to one embodiment.

FIG. 5 is a schematic representation of the availability filter 400 according to some embodiments. For the combination of dimensions on which the availability filter 400 is to be applied (the dimensions being defined by the search request 11 and including for example the dimensions "Flight" and "Date"), all the ancillary products ('service features') available for each segment of a main product may be first extracted in the encoding phase using near real-time availability data from the inventory database 4. The ancillary products may be represented by a product identifier. The availability filter 400 may comprise an encoder 402 configured to implement the encoding phase. The encoder 402 thus generates the reference binary masks.

The availability filter 400 is configured to filter the results returned by the search server 101 by ancillary product availability. More specifically, the availability filter 400 may be configured to eliminate the products among the itinerary options returned by the search server 101 which do not match an availability condition related to the specified ancillary product. The availability filter 400 may use the data from the inventory database 4, which may include the ancillary library. The inventory database 4 may include quota-based service inventory data. The inventory database 4 may be built and updated statically, periodically or dynamically, according to predefined refresh rules or refresh conditions. In some embodiments, the inventory database 4 may be fed by various data sources (such as a service inventory, a fare filing, etc.).

The inventory database 4 may comprise a number of dimensions related to the main products and ancillary products provided by the travel provider system, including for example, a segment dimension; a date dimension; an airline dimension; a fare basis dimension; and/or a product code dimension; etc.

The availability filter 400 may be configured to compute and use probabilistic data structures 121, such as compact fixed size binary arrays or Bloom filters, from the inventory database 4. In response to a query to such probabilistic data structures 401 identifying the ancillary product specified in the request and a given product segment, the probabilistic data structures may be configured to return a response indicating whether the specified ancillary product is available for the product segment. The following description of some embodiments will be made with reference to probabilistic data structures of Bloom filter type for illustration purpose only.

As used herein, a Bloom filter 401 represents a bit vector (also called 'binary mask') of an arbitrary length comprising a set of bits, each bit corresponding to a binary information (indicating a 'true' or 'false' value). A Bloom filter thus provides access to binary information in correspondence with each bit position in the bit vector.

In the decoding phase, the availability filter 400 may be configured to perform a search using a decoder 403. In the search phase implemented by the availability filter 400, the search parameters may be also encoded as a Bloom filter by the encoder 402 using the same hashing functions. The search parameters correspond to the one or more ancillary products specified in the search request 11.

The decoder 403 may be configured to implement the decoding phase. The decoder 403 may apply, for each segment of a main product determined by the search server 101, the M hashing functions to the ancillary products identified in the search request 11 to determine an Elementary Bloom filter in the form of a bit vector V for the ancillary products.

If the ancillary products comprise one service, the Bloom filter is generated by applying the M hashing functions to a predicate related to the availability of this service for the considered segment, each bit of the binary vector representing the Bloom filter having a binary value, such binary value may have a first value indicating availability of the service for the segment (such as a 'true' value) or a second value indicating unavailability of the service for the segment (such as a 'false' value).

When the ancillary products specified in the request comprises K services, the availability filter 400 may comprise a processing unit 404 configured to combine the Bloom filters $V_1, \ldots, V_K$ separately generated for each service of the ancillary products using a logical operator such as a binary OR, which provides a resulting Bloom filter V' for the considered ancillary products and the considered segment. A resulting Bloom filter V' is thus associated with multiple service features available for a given segment. The resulting Bloom filter computed for the ancillary products may be stored in a data structure such as the Bloom filter matrix or array 401. For example, if the search request 11 specifies the service "Bassinet for baby", such service feature will be encoded by the encoder 122 as "10000001".

The availability filter 400 may then determine if the ancillary products specified in the search request 11 are available for the specified itinerary (as specified by the search request 11). More specifically, to determine the availability of the ancillary products specified in the search request 11, the availability filter 400 may determine for each segment returned by the search server 101 if the Bloom filter associated with the specified ancillary products matches one of the Bloom filters associated with the segment in the Bloom filter data structure 401. A segment is identified as matching the specified ancillary products if the bits determined for the queried ancillary products (search pattern) match the bits of the ancillary products associated with the segment in the data structure 401. If a matching is determined, the segment is kept as a candidate segment. Otherwise, the segment is filtered out (or removed) from the set of itinerary options.

The following table illustrates an exemplary processing of a segment of a main product using a Bloom filter:

TABLE 2

| Segment | Bloom filter | Match |
|---|---|---|
| AF123 LON-PAR DEC01 | 10000011 | Y |
| LH456 LON-PAR DEC01 | 00100011 | N |

In the above example, a negative result is returned, for the segment "LH456 LON-PAR DEC01", as there is no correspondence between the Bloom filter "10000001" corresponding to the searched ancillary products and the Bloom filter "00100011" corresponding to the ancillary products stored in data structure 401 for segment "LH456 LON-PAR DEC01" (the first bit of the Bloom filter of the ancillary products specified in the request does not match the first bit of the Bloom filter of the ancillary products in the Bloom filter data structure 401).

It should be noted that the search phase implemented by the availability filter 400 does not impact the overall computational complexity (the search criteria can be combined and looked up within the same process). The availability filter 400 thus provides a second set of filtered products which both meet the specified ancillary products condition and the ancillary products availability condition.

Figure 6:
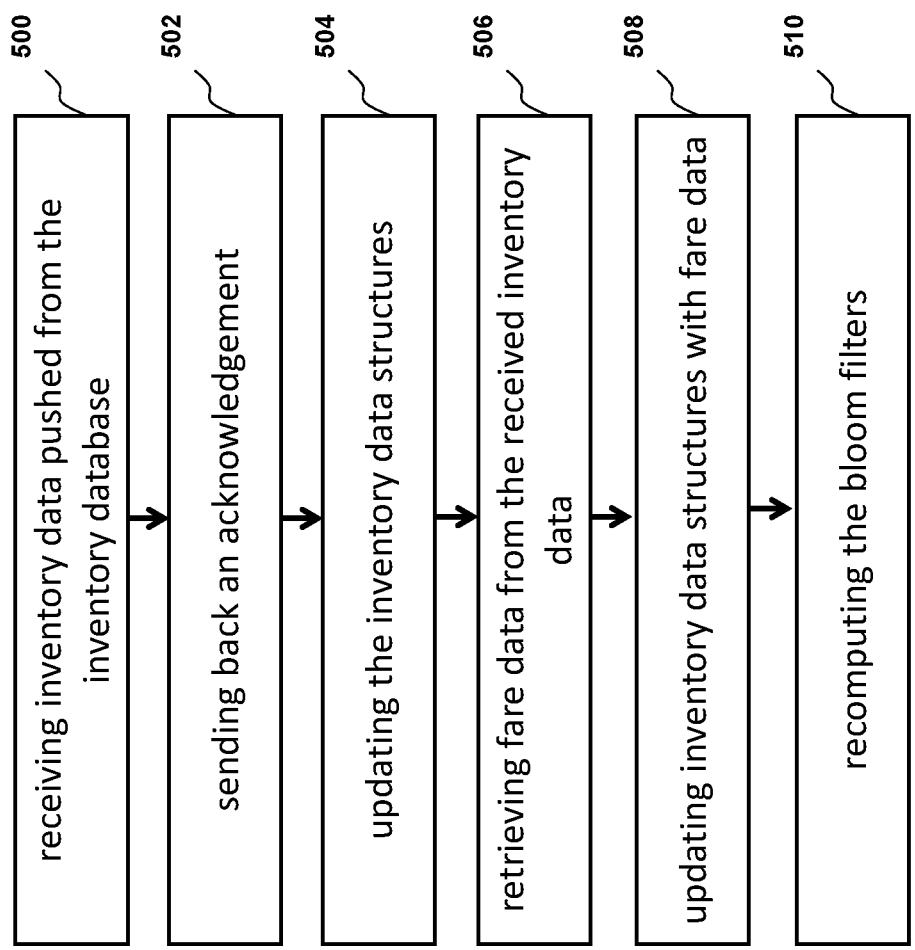
FIG. 6 is a flowchart illustrating the process of updating the Bloom filter, according to one embodiment.

FIG. 6 is a flow diagram depicting the process of updating the Bloom filter cache 405 of the availability filter 400, in an offline mode, according to some embodiments.

In an activity 500, at a selected, fixed or predetermined frequency, availability information per product and per predefined period (e.g., per day) may be pushed to the inventory database 4 form e.g. external databases (not shown in FIG. 6). The inventory database 4 may comprise for example one or more databases.

The data may be sent to the inventory database 4 based on predefined rules, such as rules related to products (flights) and period (e.g., day), in an application of the invention to the travel field. It should be noted that only a part of the product inventory availability information or the full content of the inventory may be pushed to the inventory database 4.

In response to inventory data pushed to the inventory database 4, an acknowledgement may be sent back from the inventory database 4 to the external databases, in an activity 502. In an activity 504, the inventory data structures of inventory database 4 are updated, in response to the receipt of data. In activity 504, data may be removed from the inventory database 4, added to the inventory data structures or a part of the data stored in the inventory database 4 may be updated. In an activity 506, values (also referred to as "fares" or "fare data") for which particular products are available may be retrieved also from external sources (not shown in FIG. 6) for the data newly received by the inventory database 4. In an activity 508, the inventory data structures may be updated with fare data. In an activity 510, the Bloom filters may be recomputed from the updated inventory data structures and stored in the Bloom filter Cache 401.

Figure 7:
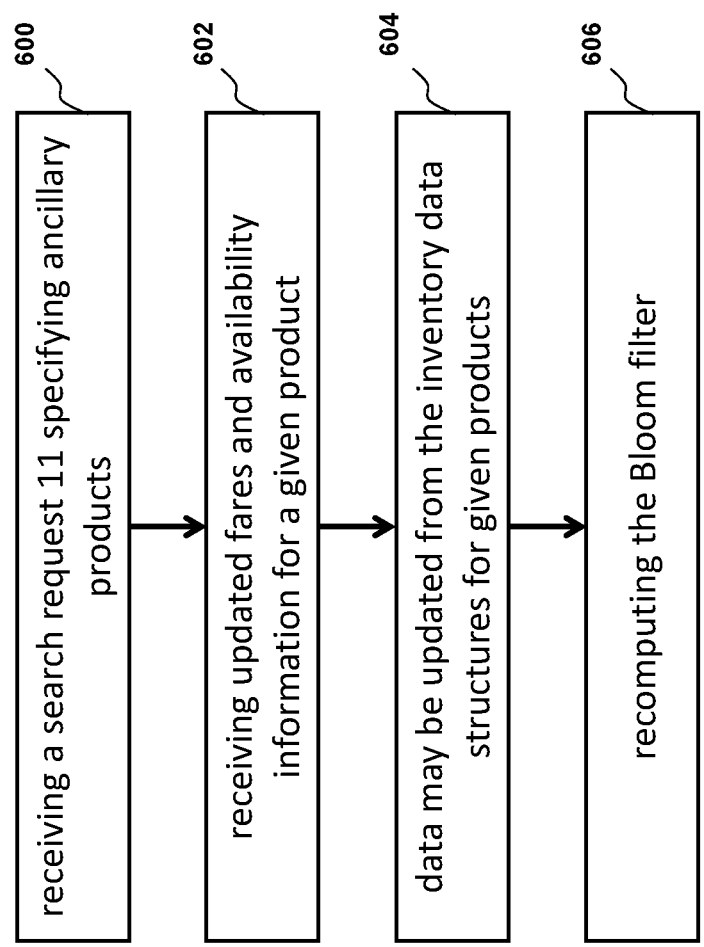
FIG. 7 is a flowchart illustrating the process of updating the Bloom filter, according to another embodiment.

FIG. 7 is a flow diagram depicting the process of updating the Bloom filter cache 401 of the availability filter 400, in an online update model, according to some embodiments.

In an activity 600, a search request 11 may be received, specifying given ancillary products.

In an activity 602, updated fares and availability information for a given product may be pushed from a pricing gateway to a pricing engine (the pricing gateway is configured to call the pricing engines) and then acknowledged by the pricing engine. In response to data pushed to the pricing engine, data may be updated from the inventory data structures for given products. For example, the data may be removed from the inventory data structures for given products (flights) and periods (e.g., days) or added to the inventory data structures or a part of the data stored may be updated in the inventory data structures with the newly received data, in an activity 604. In an activity 606, the Bloom filters may be recomputed and stored in the Bloom filter cache 401.

Figure 8:
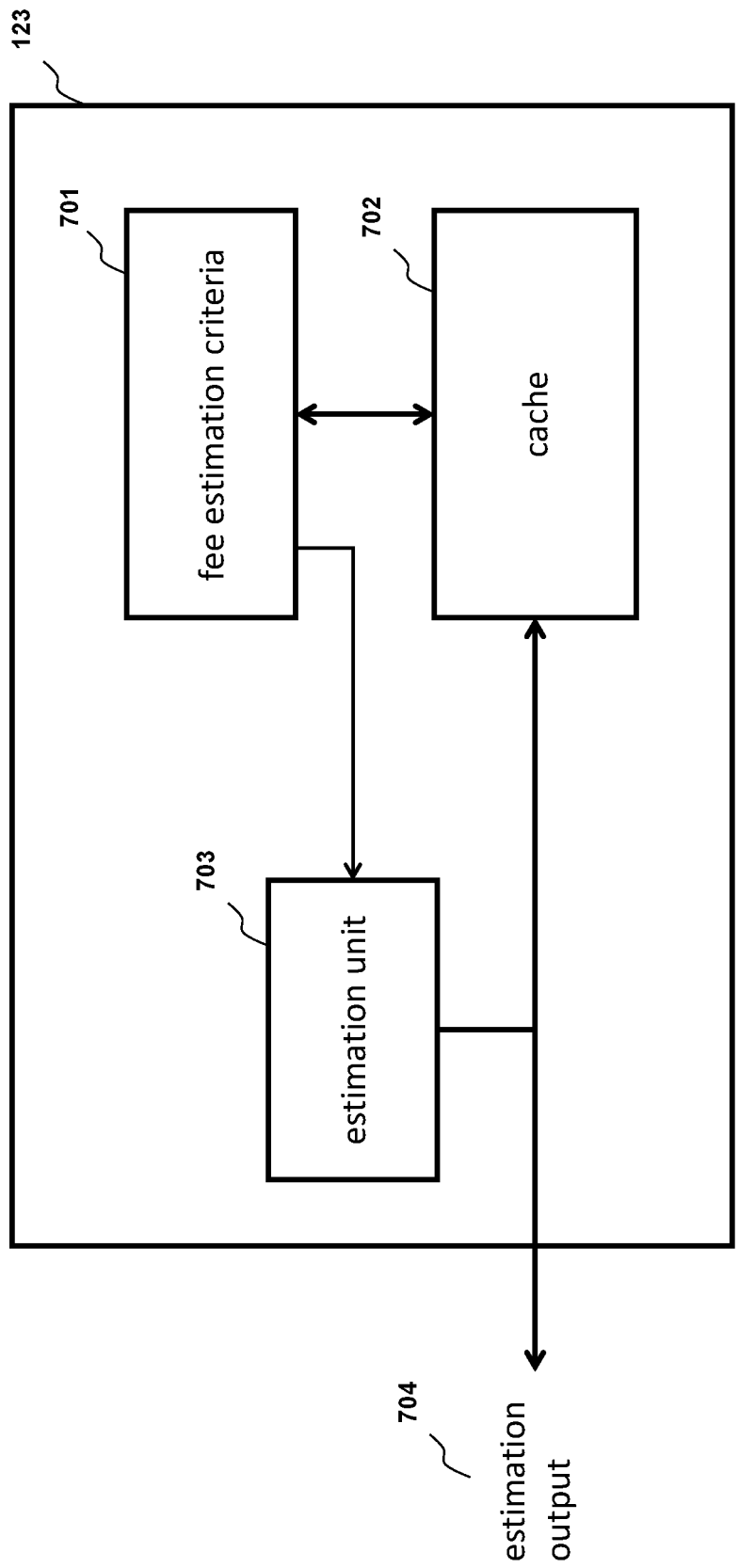
FIG. 8 is a schematic representation of an ancillary fee estimator according to some embodiments.

FIG. 8 is a schematic representation of the ancillary fee estimator 123 according to some embodiments.

The ancillary fee estimator 123 may be configured to determine flight fares for each product among the products returned by the search server 101 and filtered by the availability filter 400, while including an estimated price for requested ancillary products. The ancillary fee estimator 123 may take into account one or more criteria 701 (referred to hereinafter as "ancillary fee estimation criteria") to estimate an ancillary fee for each product of the filtered list of products, including criteria related to the main product and criteria related to the specified ancillary products. The ancillary fee estimator 123 may provide an estimation output 704 in the form of a minimal fee amount or exact fee amount. In some embodiments, the estimation output may be associated with a context related to the product. For example, for a travel product, the ancillary fee estimator 123 may provide an estimation output depending on the cabin context. For example, the estimation output associated with a given ancillary product S1 (e.g., "Bassinet or Baby") may comprise a product fee determined as equal to at least 10 EUR "whatever the cabin" (travel product context).

Ancillary fee estimation criteria 123 may comprise a set of criteria that are similar to the criteria used by the availability filter 400, such as: criteria based on the office identifier (ID) representing the identifier of an office or Point of sale of a product of the filtered list; criteria based on parameters of the search request 11 such as a date, time, or origin and/or destination information; criteria based on the carrier(s) associated with the product (such as marketing and/or operating information related to the carrier(s)); criteria based on the departure date parameter of the product; criteria based on a product code(s) associated with the specified ancillary products; criteria based on the fare type, etc.

Ancillary fee estimation criteria 701 may further comprise other types of criteria, such as criteria based on: additional product information related to the segmentation of the product (e.g., stopover, transfer, turn over point information); additional fare information (e.g., the fare basis); passenger information related to the user emitting the search request 11 such as the Passenger Type Code (e.g., adult or child passenger category) or frequent flyer information; the booking date (as assumed such as the current date); information related to options of the products such as the cabin type, Seat characteristics or baggage information; ancillary product availability information (grade); etc.

The ancillary fee estimator 123 may provide an estimation output 704 (also referred to as "the estimation result") in various formats based on the applied fee estimation criteria and the fare load data 113 which store fare data related to a given ancillary product. For example, the estimation output 704 can comprise one of the following information: product availability information indicating that the ancillary product is currently not available; fee information indicating a minimum fee amount together with notification information indicating that mandatory criteria are missing to make an exact fee estimate; or fee information indicating an exact fee amount.

When one or several previously missing fee estimation criteria 701 are obtained from real-time data, the fee estimator 123 can be called back with such fee estimation criteria 701 to determine a better estimated fee (or even exact).

In response to the estimation made by the ancillary fee estimator 123, the ancillary fee estimator 123 may further store in a cache 702 (referred to hereinafter as "ancillary fee estimation cache") data related to the estimation made by the ancillary fee estimator 123, such as for example: a list of the ancillary fee estimation criteria 123 used during the estimation made by the ancillary fee estimator 123; fee estimation criteria information such as values for the applied fee estimation criteria or a list of missing criteria which represent discriminating criteria; and/or the estimation result and possibly missing criteria.

The ancillary fee estimation cache 702 may comprise one or more cache items, each cache item being associated with a given ancillary product (e.g., "Pet in cabin"), a product segment and the estimated fee. The estimated fee may have various formats. It can be expressed in the form of an exact fee (=10 Euros), a minimal fee (>10 Euros). The estimated fee may be context dependent ("cabin business") or context independent. One cache item can match multiple contexts.

The following table represents exemplary cache items which can be stored in an ancillary fee estimation cache 702, in an application of the invention to a travel provider system:

TABLE 3

| Criteria values | Ancillary product feature | Fee estimation |
| --- | --- | --- |
| AF123 LON-PAR DEC01 | Bassinet for baby | >10EUR |
| AF123 LON-PAR DEC01 Business | Bassinet for baby | >50EUR |
| AF123 LON-PAR DEC01 | Pet in cabin | N/A |

The first cache item shown in TABLE 3 indicates an estimated fee of at least 10 Euros (10 EUR) for an ancillary product "Bassinet for Baby", for the travel segment "AF123 LON-PAR DEC01". The second cache item indicates an estimated fee of at least 50 Euros (50 EUR) for an ancillary product "Bassinet for Baby", for the travel segment "AF123 LON-PAR DEC01 Business" (Business class). The third cache item does not indicate an estimated fee ("N/A") for the ancillary product "Pet In cabin", for the travel segment "AF123 LON-PAR DEC01" because the ancillary product is not available for the segment.

The post-processing unit 104 (ancillary sweeper) may be configured to call an inventory database to check real time availability data and exact fee amount of the specified ancillary products for the computed travel options. The post-processing unit 104 may use such real-time availability data and fee amount data from the inventory to: remove false positives that can occur in the product cache database 3 associated with the availability filter 400 (Bloom filters), and/or determine an exact fee amount for a given product if the ancillary fee estimation cache only determines a minimum fee amount and notifies that criteria are missing.

Figure 9:
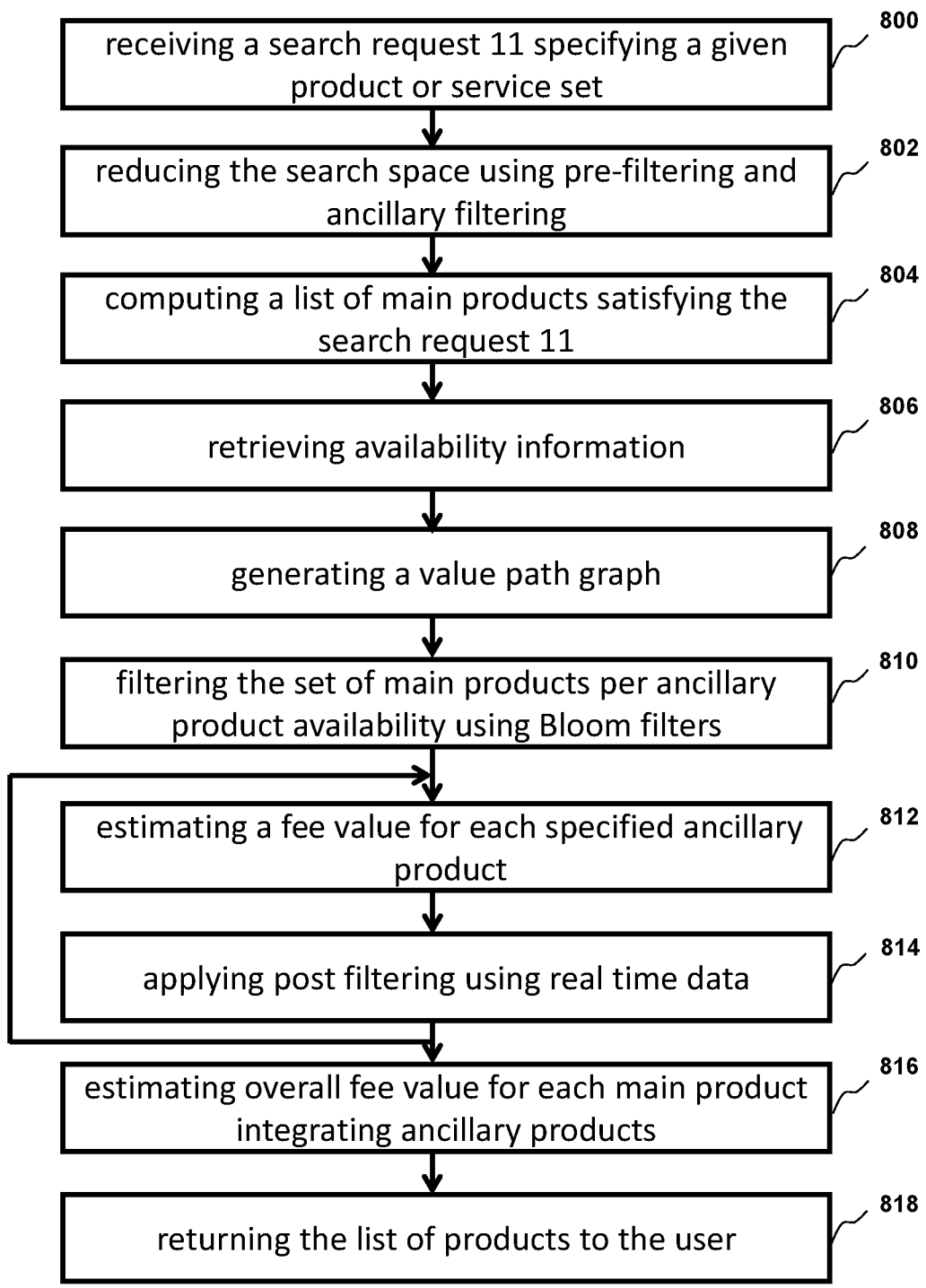
FIG. 9 is a flowchart illustrating the process of processing a search request, in accordance with some embodiments.

FIG. 9 depicts a method of providing products to a user in response to a search request 11 specifying main product parameters and ancillary product parameters, according to some embodiments.

In an activity 800, the search request 11 is received from a user.

In an activity 802, pre-filtering and ancillary filtering is performed to reduce the search space to the products that match the specified ancillary products. Accordingly, main products that do not match the request for specified ancillary products are removed from the search space. In an application of the invention to a travel provider system, activity 802 may comprise: computing the routes between the origin and the destination specified in the search request 11; and removing the routes for the carriers that do not provide the specified ancillary products.

In an activity 804, a list is computed comprising the main products satisfying search request 11.

In an activity 806, availability information for the main products returned in activity 804 may be retrieved from inventory database 4. Invalid products (i.e., products which are considered as unavailable) may be removed.

In an activity 808, a fare path graph (also referred to as a "value path graph") may be generated using fare data 113. Fare information and fare rules may be then loaded.

In an activity 810, an availability filtering may be performed to filter the list of main products obtained in an activity 804 per ancillary product availability using Bloom filters 401. This provides a filtered list of main products that both match the ancillary product type and the ancillary product current availability conditions.

In an activity 812, a fee is determined for each specified ancillary product associated with an elementary portion (segment) of a main product of the list of main products determined in activity 810.

In an activity 814, an additional post-filtering (also called 'post-processing') may be further performed to remove false positives and/or determine an exact fee for a specified product using real-time data from an inventory database storing real time data related to the availability on one or more products. The post-filtering may be further performed to remove false positives and/or determine an exact fee for a specified product. Activity 814 may be triggered when one or several previously missing fee estimation criteria are known (from real-time data). In response to the receipt of new fee estimation criteria, activity 814 may return to activity 812 to make an improved fee estimation using the new input criteria 701.

In an activity 816, an overall fee is determined for each main product of the filtered list of main products determined in activity 806 which both integrates the fee of the main product and the fee of the specified ancillary products using fare rules.

In an activity 818, the result of the main products that match the search request 11 (as determined in activities 810 and 814) may be returned to the user or client 2 in the dedicated user interface of the product provider system, including the overall fee for each main product (as determined in 816), for example in the form of travel flight options that can be selected and purchased by the user.

FIG. 10 is a diagrammatic representation of the internal component of a computing machine of the search engine 1, client 2, product cache database 3, inventory database 4 or other databases and caches described herein. The computing machine 900 includes a set of instructions to cause the computing machine 900 to perform any of the methodologies discussed herein when executed by the computing machine 900. The computing machine 900 includes at least one processor 901, a main memory 906 and a network interface device 903 which communicate with each other via a bus 904. Optionally, the computing machine 900 may further include a static memory 905 and a disk-drive unit. A video display, an alpha-numeric input device and a cursor control device may be provided as examples of user interface 902. The network interface device 903 connects the computing machine 900 to the other components of the distributed computing system such as the search engine 1, client 2, product cache database 3, inventory database 4 or other databases and caches described herein.

Computing machine 900 also hosts the cache 907. The cache 907 within the present embodiments may be composed of hardware and software components that store the database tables so that future requests for the database tables can be served faster than without caching. There can be hardware-based caches such as CPU caches, GPU caches, digital signal processors and translation lookaside buffers, as well as software-based caches such as page caches, web caches (Hypertext Transfer Protocol, HTTP, caches) etc. Search engine 1, client 2, product cache database 3, inventory database 4 or other databases and caches described herein may comprise of a cache 907.

A set of computer-executable instructions (i.e., computer program code) embodying any one, or all, of the methodologies described herein, resides completely, or at least partially, in or on a machine-readable medium, e.g., the main memory 906. Main memory 906 hosts computer program code for functional entities such as database request processing 908 which includes the functionality to receive and process database requests and data processing functionality 909. The instructions may further be transmitted or received as a propagated signal via the Internet through the network interface device 903 or via the user interface 902. Communication within computing machine is performed via bus 904. Basic operation of the computing machine 900 is controlled by an operating system which is also located in the main memory 906, the at least one processor 901 and/or the static memory 905.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

What is claimed is:

1. A method for processing database search requests in a distributed computing environment comprising a search engine, a product cache database, and an inventory database, wherein:

the product cache database is configured to store data records specifying main products retrieved from one or more provider databases, wherein each main product is associated with a reference binary mask representing, in binary format, a plurality of ancillary products associated with the corresponding main product, wherein the reference binary mask is generated based on data received from the one or more provider databases and stored in the product cache database;

the inventory database is configured to store availability data related to the main products and availability data related to the ancillary products associated with the main products; and the method comprises, by the search engine on a computing system:

determining, in response to a search request from a client, a set of main products corresponding to search criteria indicated in the search request;

generating a search binary mask based on the search criteria indicated in the search request which identify one or more ancillary products;

determining a subset of the determined set of main products, the subset comprising the main products with associated ancillary products as identified in the search request, by:

retrieving, from the product cache database, the reference binary mask for each main product in the set of main products, comparing the search binary mask with the reference binary mask for each main product in the set of main products and selecting the main product for the subset if the search binary mask and the respective reference binary mask match, and determining an availability for the ancillary products associated with each main product in the subset by retrieving the corresponding availability data from the inventory database;

updating, for each main product in the subset, the reference binary mask in the product cache database if one or more of the ancillary products associated with the main product in the subset are determined as unavailable; and returning at least one main product of the subset, for which the availability of the associated ancillary products was determined, to the client.

2. The method of claim 1 further comprising:

determining by retrieving, in response to the search request from the client, from the product cache database, the set of main products corresponding to the search criteria indicated in the search request;

determining an availability for each main product in the subset by retrieving the corresponding availability data from the inventory database; and for each main product in the subset, deleting the main product from the subset if the main product is determined as unavailable, thereby modifying the subset of main products.

3. The method of claim 1 further comprising:

determining by retrieving, in response to the search request from the client, from the one or more provider databases, the set of main products corresponding to the search criteria indicated in the search request.

4. The method of claim 1 further comprising:

computing one or more fares corresponding to the main products in the subset and/or the ancillary products associated with the main products in the subset; and adding the one or more fares to the subset.

5. The method of claim 4 further comprising:

computing price solutions for the main products in the subset and/or the ancillary products associated with the main products in the subset and adding the price solutions to the subset.

6. The method of claim 1 further comprising:

computing price solutions for the main products in the subset and/or the ancillary products associated with the main products in the subset and adding the price solutions to the subset.

7. The method of claim 1 wherein the reference binary mask and/or the search binary mask is a binary vector comprising a plurality of binary components, and the binary components are generated by a predefined function.

8. The method of claim 7 wherein the reference binary mask is a Bloom filter.

9. The method of claim 7 wherein the search binary mask is a Bloom filter.

10. The method of claim 1 wherein determining an availability for each main product in the subset and/or the ancillary products associated with each main product in the subset comprises:

issuing an availability request to the inventory database and receiving a response to the availability request;

identifying the main product and/or the ancillary products as available if the response to the availability request returns an indication that the main product and/or the ancillary products are available; and identifying the main product and/or the ancillary products as unavailable if the response to the availability request returns an indication that the main product and/or the ancillary products are not available.

11. A system for processing database search requests in a distributed computing environment, the system comprising:

at least one processor;

a memory;

a product cache database configured to store data records specifying main products retrieved from one or more provider databases, wherein each main product is associated with a reference binary mask, representing in binary format, a plurality of ancillary products associated with the corresponding main product, and the reference binary mask is generated based on data received from the one or more provider databases and stored in the product cache database; and an inventory database configured to store availability data related to the main products and real-time availability data related to the ancillary products associated with the main products;

wherein the memory includes instructions that, when executed by the at least one processor, cause the system to:

determine, in response to a search request from a client, a set of main products corresponding to search criteria indicated in the search request;

generate a search binary mask based on the search criteria indicated in the search request which identify one or more ancillary products;

determine a subset of the determined set of main products, the subset comprising the main products with associated ancillary products as identified in the search request, by:

retrieving, from the product cache database, the reference binary mask for each main product in the set of main products, comparing the search binary mask with the reference binary mask for each main product in the set of main products and selecting the main product for the subset if the search binary mask and the respective reference binary mask match, and determining an availability for the ancillary products associated with each main product in the subset by retrieving the corresponding availability data from the inventory database;

update the reference binary mask in the product cache database if one or more of the ancillary products associated with the main product in the subset are determined as unavailable; and return at least one main product of the subset, for which the availability of the associated ancillary products was determined, to the client.

12. The system of claim 11 wherein the instructions, when executed by the at least one processor, further cause the system to:
- determine by retrieving, in response to the search request from the client, from the product cache database, the set of main products corresponding to the search criteria indicated in the search request;
- determine an availability for each main product in the subset by retrieving the corresponding availability data from the inventory database; and
- for each main product in the subset, delete the main product from the subset if the main product is determined as unavailable, thereby modifying the subset of main products.

13. The system of claim 11 wherein the instructions, when executed by the at least one processor, further cause the system to:
- determine by retrieving, in response to the search request from the client, from the one or more provider databases, the set of main products corresponding to the search criteria indicated in the search request.

14. The system of claim 11 wherein the instructions, when executed by the at least one processor, further cause the system to:
- compute one or more fares corresponding to the main products in the subset and/or the ancillary products associated with the main products in the subset and adding the one or more fares to the subset.

15. The system of claim 14 wherein the instructions, when executed by the at least one processor, further cause the system to:
- compute price solutions for the main products in the subset and/or the ancillary products associated with the main products in the subset and adding the price solutions to the subset.

16. The system of claim 11 wherein the instructions, when executed by the at least one processor, further cause the system to:
- compute price solutions for the main products in the subset and/or the ancillary products associated with the main products in the subset and add the price solutions to the subset.

17. The system of claim 11 wherein the instructions, when executed by the at least one processor, further cause the system to determine an availability for each main product in the subset and/or the ancillary products associated with each main product in the subset by:
- issuing an availability request to the inventory database and receiving a response to the availability request;
- identifying the main product and/or the ancillary products as available if the response to the availability request returns an indication that the main product and/or the ancillary products are available; and
- identifying the main product and/or the ancillary products as unavailable if the response to the availability request returns an indication that the main product and/or the ancillary products are not available.

18. The system of claim 11 wherein the reference binary mask and/or the search binary mask is a binary vector comprising a plurality of binary components, and the binary components are generated by a predefined function.

19. The system of claim 18 wherein the reference binary mask or the search binary mask is a Bloom filter.

20. A non-transitory computer-readable storage medium storing instructions thereon that, upon execution by a processor of a computing device cause the computing device to process database search requests in a distributed computing environment comprising a product cache database and an inventory database, wherein:
- the product cache database is configured to store data records specifying main products retrieved from one or more provider databases, wherein each main product is associated with a reference binary mask representing, in binary format, a plurality of ancillary products associated with the corresponding main product, wherein the reference binary mask is generated based on data received from the one or more provider databases and stored in the product cache database;
- the inventory database is configured to store availability data related to the main products and real-time availability data related to the ancillary products associated with the main products; and
- wherein the instructions upon execution by the processor of the computing device, cause the computing device to:
- determine, in response to a search request from a client, a set of main products corresponding to search criteria indicated in the search request;
- generate a search binary mask based on the search criteria indicated in the search request which identify one or more ancillary products;
- determine a subset of the determined set of main products, the subset comprising the main products with associated ancillary products as identified in the search request, by:
  - retrieving, from the product cache database, the reference binary mask for each main product in the set of main products,
  - comparing the search binary mask with the reference binary mask for each main product in the set of main products and selecting the main product for the subset if the search binary mask and the respective reference binary mask match, and
  - determining an availability for the ancillary products associated with each main product in the subset by retrieving the corresponding availability data from the inventory database;
- update the reference binary mask in the product cache database if one or more of the ancillary products associated with the main product in the subset are determined as unavailable; and
- return at least one main product of the subset, for which the availability of the associated ancillary products was determined, to the client.

* * * * *